United States Patent [19]
Hamada et al.

[11] 3,872,000
[45] Mar. 18, 1975

[54] LIQUID FLOCCULANT COMPRISING CONDENSATION PRODUCT OF AROMATIC ALDEHYDE AND POLYOL

[75] Inventors: Kenzo Hamada; Hiroshi Uchiyama, both of Osaka; Jiro Sugi, Tokyo; Osamu Kamada, Kawasaki, all of Japan

[73] Assignees: E. C. Chemical Industries & Co., Ltd., Osaka-fu; Mitsubishi Chemical Indsutries Ltd., Tokyo, both of, Japan

[22] Filed: Apr. 9, 1973

[21] Appl. No.: 349,325

[30] Foreign Application Priority Data
Apr. 8, 1972 Japan................................ 47-35390

[52] U.S. Cl............. 210/54, 260/29.2 R, 260/47 R, 260/67 R, 260/67 UC
[51] Int. Cl..... B01d 21/01, C08f 3/40, C08g 11/00
[58] Field of Search......... 260/29.2 R, 67 R; 210/54

[56] References Cited
UNITED STATES PATENTS

| | | | |
|---|---|---|---|
| 2,643,236 | 6/1953 | Kropa et al. | 260/29.2 R |
| 2,785,947 | 3/1957 | Kress et al. | 260/67 R |
| 2,826,514 | 3/1958 | Schroeder | 260/29.2 R |
| 2,926,179 | 2/1960 | Linn | 260/67 R |
| 3,100,135 | 8/1963 | Sexsmith | 260/67 R |

Primary Examiner—Murray Tillman
Assistant Examiner—Arthur H. Koeckert
Attorney, Agent, or Firm—Oblon, Fisher, Spivak, McClelland & Maier

[57] ABSTRACT

A filamentous liquid composition with improved flocculant characteristics which can be used in various industrial processes has been found which comprises a mixture consisting essentially of a condensation product of an aromatic aldehyde and a polyhydroxy alcohol containing at least four hydroxyl groups, a surfactant and a polar organic solvent which is uniformly dispersed in water.

15 Claims, No Drawings

LIQUID FLOCCULANT COMPRISING CONDENSATION PRODUCT OF AROMATIC ALDEHYDE AND POLYOL

BACKGROUND OF THE INVENTION

1. Field of the Invention:

This invention relates to a condensation composition used for flocculation and other applications.

2. Description of the Prior Art

Recently, the quantity of fluid drainage discharged from homes and factories has greatly increased. Drainage contains various organic and inorganic materials in various concentrations. Thus, the pollution of rivers and seas by fluid drainage has become an extensive problem, and many methods have been proposed to overcome the problems of fluid wastes. However, new methods are still needed to overcome many of these problems that remain unsolved.

In one of the conventional methods of treating fluid drainage, inorganic materials such as milk of lime, aluminum sulfate, alum, ferrous sulfate, ferrous chloride; or organic materials such as polyacrylamide, and the like have been used. These flocculants are readily affected by the pH value of the fluid wastes, and their performance is adversely affected beyond optimum pH values. Even when the optimum pH values are maintained the flocculants still do not achieve their maximum efficiency, and, moreover, separation of coagulated materials is not easy because the coagulated materials are very often hydrophilic.

In the past one method of attaining greater coagulation and flocculation effects than possible with a single flocculant, has been the use of combinations of two or more flocculants. However, satisfactory results have not been obtained with this technique, and, moreover, the amount of sludge has increased thus requiring a large amount of labor for this type of process.

A need, therefore, exists for flocculants which overcome the inefficiencies and coagulation effects of conventional flocculants. Recent studies on the problem have succeeded in developing flocculants which overcome the disadvantages of the prior art flocculants. These flocculants have excellent characteristics and may be used in various applications.

SUMMARY OF THE INVENTION

One object of this invention is to provide a composition of a condensation product which possesses improved flocculant characteristics and which can be used for various industrial applications.

Another object of this invention is to provide a viscous composition which is useful in various industrial applications.

Briefly, these objects and other objects of this invention, as hereinafter will become readily apparent can be achieved by a filamentous liquid composition prepared by uniformly dispersing a solution of a mixture of a condensate of a polyhydric alcohol containing at least four hydroxy groups with an aromatic aldehyde, a surfactant and a polar solvent in water with stirring.

DESCRIPTION OF THE PREFERRED EMBODIMENTS

The condensation product of a polyhydric alcohol containing at least four hydroxy groups with an aromatic aldehyde is hereinafter referred to as a condensate. Suitable aromatic aldehydes useful in the composition of this invention include benzaldehyde, substituted benzaldehydes, phenylalkanals such as phenylacetaldehyde or phenylalkenyl aldehydes. Suitable substituted benzaldehydes include benzaldehydes having a lower alkyl group such as methyl, ethyl, propyl, isopropyl, tert-butyl and the like; alkoxy groups such as methoxyl, ethoxyl and the like; hydroxyl groups and halogen substituted aromatic residues. Specific aldehydes which are preferably used include benzaldehyde, tolualdehyde, cinnamaldehyde, cuminaldehyde, methoxybenzaldehyde, piperonal, chlorobenzaldehyde and p-oxy-m-methoxybenzaldehyde. Suitable polyhydric alcohols containing at least four hydroxyl groups include pentaerythritol; pentitols such as xylitol, arabitol and adonitol; and hexitols such as sorbitol, mannitol, iditol, talitol, dulcitol and allitol. Preferably pentitols or hexitols, especially xylitol and sorbitol, are used because they are easily obtained. It is also possible to use polyhydric alcohols having an inert substituent which does not obstruct the condensation reaction of the polyhydric alcohol with an aldehyde.

Various known condensation reactions of an aldehyde with an alcohol can be used for the condensation reaction of the polyhydric alcohols with the aromatic aldehydes. Usually, the aromatic aldehyde is reacted with the polyhydric alcohol in the presence of a solvent, or in the absence of a solvent in the presence of a catalyst of an inorganic acid such as sulfuric acid, hydrochloric acid, phosphoric acid, and the like; or an organic acid such as benzenesulfonic acid, paratoluenesulfonic acid and the like. Preferably, the reaction is conducted with concentrations of acid that afford dehydration conditions.

The use of increasingly higher reaction temperatures results in increasingly greater reaction velocities. However, the reaction temperature is not limited, and appropriate temperatures can be selected depending upon the type of reaction condition desired. Usually a temperature range of 100° – 250° C is employed. The molar ratio of the aromatic aldehyde to the polyhydric alcohol used usually is in the range of from 1:2–3:1, preferably 1:1–2.5:1 and is most preferably about 2:1.

The product from the condensation reaction is treated with an organic solvent such as methanol and/or hot water in order to remove unreacted materials, water, acid catalyst and the like. The products are isolated as a solid or powder. It is also possible to obtain similar products by substituting a portion of the polyhydric alcohol having at least four hydroxyl groups with a saccharide such as glucose, galactose, mannose, fructose, maltose, lactose, sucrose, dextrin, and the like.

In the preparation of the composition of this invention, the resulting condensate or product is dissolved in a polar organic solvent together with a surfactant. The condensates are sparingly soluble in the polar organic solvents at normal temperatures. Accordingly, it is preferable to heat the mixtures. While heating the mixtures, it is preferable to continue heating the mixtures for a short time after dissolution of the condensates forming uniform solutions of the three components because dispersibility of the solution in water is improved. The reason for this is not clear, however, it is assumed that the condensate may be modified by the surfactant and the polar organic solvent. The temperatures used in heating usually range from 40°C to the boiling point of the polar organic solvent, and is preferably 50° – 150°C, especially 80° – 120°C.

The surfactants used for the preparation of the compositions of this invention are preferably ionic surfactants such as anionic, cationic and amphoteric surfactants. But nonionic surfactants can also be used. Suitable anionic surfactants include sodium alkylsulfate, sodium amide sulfate, sodium glycol ether sulfates prepared by neutralizing polyoxyethylene ether which is an ethyleneoxide adduct of a higher alcohol, alkylphenol, alkylolamide, or the like; sodium alkylsulfonate; sodium alkylarylsulfonate; sodium amide sulfonate; sodium alkyl phosphate; sodium alkyl polyoxyethylene phosphate; sodium alkyl phosphonate; and sodium alkyl polyoxyethylene phosphonate.

Suitable cationic surfactants include quaternary trimethylammonium chlorides containing higher alkyl groups such as dodecyl, hexadecyl, and the like, or higher alkenyl groups such as octadecenyl, octadecadienyl and the like; quaternary dimethylammonium chlorides containing two of said higher alkyl or alkenyl groups; quaternary ammonium chlorides containing higher alkyl or alkenyl groups which are partially substituted with a glycol ether bond; pyridinium halides such as higher alkyl pyridinium chlorides or bromides; alkoxymethyl pyridinium chlorides or bromides; and substituted imidazoline salts such as 1-oxyethyl-2-alkyl or alkenyl substituted imidazoline salts. The optimum surfactants used in the composition of this invention are the quaternary ammonium halides, the imidazoline cationic surfactants or the amphoteric surfactants. Other optimum surfactants include alkali alkyl or alkylaryl polyoxyethylene sulfates or anionic phosphate surfactants. Still other optimum surfactants include alkyl or alkylaryl polyoxyethylene nonionic surfactants. Certain mixtures of these surfactants are especially preferable.

Suitable amphoteric surfactants include various compounds containing amino or quaternary ammonium groups as the cationically active portions of the compounds and carboxylic acid, sulfonate or sulfate residues as the anionically active portions of the compounds.

Suitable polar organic solvents include N-alkylamides such as dimethylformamide, N-methylpyrrolidone; nitriles such as acetonitrile; alkyl sulfoxides such as dimethylsulfoxide, sulfolane and the like; mono- and dialkyl ethers of ethyleneglycols and their derivatives known commercially as "Cellosolves" such as ethyl cellosolve and methyl cellosolve; alcohols such as methanol, ethanol, isopropanol, butanol; and ketones such as acetone. It is also possible to use any one of these solvents which contain a small amount of water.

The ratios of the three components used in the present composition vary depending upon the application of the compositions and are usually selected to fall within the range of 5 – 50 : 15 – 50 : 15 – 50 by weight of the condensate: the surfactant: and the polar organic solvent. The solutions containing the three components have the characteristic of forming gels with relatively large amounts of water in comparison to the relatively small amounts of solution used.

In order to disperse the solution in water, it is necessary to thoroughly stir the mixture. Since more power is required for stirring solutions which have low temperatures, the temperature of water used for forming the dispersion is preferably higher than ambient temperatures and is especially about 60° – 80° C for industrial operations.

When solutions containing the three components are added to water, at least a partial gel is formed. Accordingly, in order to uniformly disperse the solution in water, high power stirring is necessary to achieve effective stirring. Preferably, the solutions are stirred by agitation which crushes the solids, by high speed agitation with a homogenizer known as an emulsifier, by ultrasonic agitation which results in an emulsion, or by high speed agitation which causes cavitation. For example, rotation of the stirrer is maintained at speeds greater than 200 r.p.m., preferably 300 – 10,000 rpm.

The concentration of the three components in the solution of the present composition is usually in the range of about 0.01 – 10 percent by weight, preferably 1 – 5 percent by weight in the form of the dried solid components of the condensate and the surfactant. If the concentration of the components is below the minimum range, the compositions sometimes exist as a diluted emulsion or a solution which is not filamentous in appearance. On the other hand, when the concentration of the three components is greater than the maximum range, certain over-loads result in the uniform dispersion of the three components in water rendering the solutions inconvenient for practical operations. The composition of this invention can be readily diluted with large amounts of water to concentrations less than 0.01 percent of the solid concentration, and the solutions can be used in a form which is not filamentous in appearance for certain applications as coagulants or flocculants or the like. However, it is necessary to prepare the composition of this invention to be within the specified range of the concentration of the solid components when the three components are uniformly dispersed in water in order to maintain the flocculating characteristics. In this invention, this range is critical for the preparation of the composition. The composition of this invention wherein the three components are uniformly dispersed in water seems to be a pseudo-aqueous solution or an o/w emulsion, although its exact nature is not clear. The characteristic property of the composition is that it is a viscous liquid, and it has high threadability characteristics for forming liquid threads or filaments longer than 20 cm and the ability to resist separation when the composition is separated into two portions, for example, when the edge of a rod is immersed into the solution and then pulled from the composition. The terms "filamentous," "threadable" or "threadability" describe the characteristics of the viscous liquids which have the ability to form long, liquid filamentous tails when a portion of the liquid mass is pulled away.

The composition of this invention can be used as a flocculant or a coagulant for the clarification of various kinds of fluid drainage. Only small amounts of the flocculant are necessary to treat drainage material so that it is very economical. It also exhibits unpredicable coagulation effects. For example, the composition is very effective for the coagulation of inorganic materials as well as organic materials without being appreciably effected by changes in pH, so that the composition can be applied to various types of fluid drainage, especially various emulsion drainage materials containing mineral oil, cutting oil, food industry drainage, dye bath drainage and the like which have been difficult to remove by conventional coagulants.

The various precipitates, sludges or flocks formed by the flocculation process are not in the form of granules, but in the form of fibers or very fine threads which have hydrophobic properties so that separation and collection of the flocculated or coagulated materials from the drainage material is very easy, and large amounts of the drainage materials can be desirably treated.

The composition of this invention can be easily diluted with water in order to decrease the viscosity of the composition, whereby the solution changes from a cloudy solution to a clear solution. The coagulating characteristics of the composition are maintained even when diluted. Accordingly, it is possible to use the composition in a diluted form.

When the composition is used as a flocculant, it is possible to combine the composition with a conventional flocculant such as a calcium compound, e.g., milk of lime, magnesium sulfate, ferrous sulfate, magnesium hydroxide, magnesium carbonate, water soluble alkylititanate, and the like; and also polyacrylamide, and the like. The composition of this invention is also useful as a viscosity increasing agent for paint and other surface modifiers, because of its threadable, high viscosity characteristics.

As stated above, the composition of this invention is a viscous material having high appreciable filamentary properties which possesses excellent coagulation characteristics even when a small amount of the composition is diluted with water. Various industrial needs can be attained by the application of this composition to polluted waste materials.

Having generally described this invention, a further understanding can be obtained by reference to certain specific examples which are provided herein for purposes of illustration only and are not intended to be limiting unless otherwise specified.

The term "part" means part by weight.

EXAMPLE 1

| | |
|---|---|
| Condensate of benzaldehyde and sorbitol (2 : 1 molar ratio) | 25 parts |
| Dodecyl trimethylammonium chloride | 37.5 parts |
| N-methylpyrrolidone | 37.5 parts |

These components were mixed with stirring at 80°C for about 5 minutes to obtain a clear uniform solution. The mixture was further maintained at the temperature for about 5 minutes and then was added to 1,900 parts of hot water at 70°C and stirred for about 20 minutes by a homogenizer. As a result, a viscous emulsion composition having threadable characteristics was obtained.

EXAMPLE 2

| | |
|---|---|
| Condensate of benzaldehyde and xylitol (2 : 1 molar ratio) | 25 parts |
| Octyltrimethylammonium chloride | 15 parts |
| Hexadecyltrimethylammonium chloride | 22.5 parts |
| Acetonitrile | 37.5 parts |

The above components were mixed and added to hot water and treated in accordance with the procedure of Example 1. A viscous composition having high threadable characteristics was obtained.

EXAMPLE 3

| | |
|---|---|
| Condensate of para methoxybenzaldehyde and sorbitol (2 : 1 molar ratio) | 25 parts |
| Hexadecyltrimethylammonium chloride | 37.5 parts |
| Sulfolane | 37.5 parts |

The above components were mixed and added to hot water and treated in accordance with the procedures of Example 1. A viscous composition having high threadable characteristics was obtained.

EXAMPLE 4

| | |
|---|---|
| Condensate of benzaldehyde and sorbitol (2 : 1 molar ratio) | 21 parts |
| Boric acid | 4 parts |
| Ditetradecyldimethylammonium chloride | 37.5 parts |
| Ethylcellosolve | 37.5 parts |

The above components were mixed and added to hot water and treated in accordance with the procedure of Example 1. A viscous composition having high threadable characteristics was obtained.

EXAMPLE 5

| | |
|---|---|
| Condensate of benzaldehyde and sorbitol (2 : 1 molar ratio) | 25 parts |
| Anionic surfactant: sodium alkyl polyoxyethylene ether sulfate (Nissan Trux manufactured by Nippon Oils and Fats Co., Ltd.) | 37.5 parts |
| N-methylolpyrrolidone | 37.5 parts |

The above components were mixed and added to hot water and treated in accordance with the procedure of Example 1. A viscous composition having high threadable characteristics was obtained.

EXAMPLE 6

| | |
|---|---|
| Condensate of benzaldehyde and sorbitol (2 : 1 molar ratio) | 25 parts |
| Anionic surfactant: sodium alkyl polyoxyethylene ether sulfate (Nissan Trux manufactured by Nippon Oils and Fats Co., Ltd.) | 37.5 parts |
| N-methylolpyrrolidone | 37.5 parts |

The above components were mixed and added to hot water and treated in accordance with the procedure of Example 1. A viscous composition having high threadable characteristics was obtained.

EXAMPLE 7

| | |
|---|---|
| Condensate of benzaldehyde and sorbitol (2 : 1 molar ratio) | 25 parts |
| Cationic surfactant Diallyl quaternary ammonium chloride (Arquad manufactured by The Lion Armour Co., Ltd.) | 37.5 parts |
| N-methylolpyrrolidone | 37.5 parts |

The above components were mixed 120°C for 20 minutes, and the mixture was added to 2,900 parts of hot water at 80°C and then was stirred for about 10 minutes by a homogenizer. A viscous emulsion composition having high threadable characteristics was obtained. The composition was diluted with 90,000 parts of water to yield a cloudy solution.

EXAMPLE 8

| | |
|---|---|
| Condensate of benzaldehyde and sorbitol (2 : 1 molar ratio) | 47 parts |
| Cationic surfactant (Same as in Example 7) | 16 parts |
| N-methylpyrrolidone | 32 parts |
| Boric acid | 5 parts |

The above components were mixed at about 90° C to yield a clear, uniform mixture. The mixture was cooled to form a gel, and the gel was crushed to form a powder. The powder was added under high speed stirring to 2,040 parts of water at 60° C to yield a dispersion. The dispersion was treated with an ultrasonic apparatus at 19.5 MH to yield a viscous composition having high threadable characteristics.

EXAMPLE 9

| | |
|---|---|
| Condensate of benzaldehyde and xylitol (2 : 1 molar ratio) | 43 parts |
| Anionic surfactant: (Same as in Example 5) | 28.5 parts |
| N-methylpyrrolidone | 28.5 parts |

The above components were mixed and treated in accordance with the procedure of Example 8. A viscous composition having high threadable characteristics was obtained.

EXAMPLE 10

| | |
|---|---|
| Condensate of isopropyl benzaldehyde and sorbitol (1.6 : 1 molar ratio) | 25 parts |
| Anionic surfactant: sodium alkyl polyoxyethylene phosphate (Nikkol TDP manufactured by Nikko Chem. Co.) | 37.5 parts |
| Dimethylformamide | 37.5 parts |

The above components were mixed and treated in accordance with the procedure of Example 1. A viscous thready liquid composition similar to that of Example 1 was obtained.

EXAMPLE 11

| | |
|---|---|
| Condensate of cinnamaldehyde and xylitol (2.2 : 1 molar ratio) | 25 parts |
| Cationic surfactant: polyoxyethylene dodecyl monomethyl ammonium chloride (Nissan Cation manufactured by Nippon Oils and Fats Co., Ltd.) | 37.5 parts |
| Isopropanol | 37.5 parts |

The above components were mixed and treated in accordance with the procedure of Example 1. A viscous thready liquid composition similar to that of Example 1 was obtained.

EXAMPLE 12

| | |
|---|---|
| Condensate of benzaldehyde and sorbitol (2.3 : 1 molar ratio) | 30 parts |
| Cationic surfactant: 1-hydroxyethyl-2-fatty acid substituted imidazoline salt of acetic acid (Nissan Cation manufactured by Nippon Oils and Fats Co., Ltd.) | 35 parts |
| N-methylpyrrolidone | 35 parts |

The above components were mixed and treated in accordance with the procedure of Example 1. A viscous thready liquid composition similar to that of Example 1 was obtained.

EXAMPLE 13

| | |
|---|---|
| Condensate of benzaldehyde and xylitol (1.2 : 1 molar ratio) | 25 parts |
| Nonionic surfactant: alkylphenol polyoxyethylene ether (Nissan Nonion manufactured by Nippon Oils and Fats Co., Ltd.) | 25 parts |
| Dimethylacetamide | 40 parts |

The above components were mixed and treated in accordance with the procedure of Example 1. A viscous thready liquid composition similar to that of Example 1 was obtained.

TEST 1

To 200 ml of cloudy water containing 1,000 ppm of kaolin clay, 20 ml of the diluted cloudy solution of Example 7 was added. The mixture was stirred and allowed to remain quiescent for 10 minutes. The cloudiness of the resulting supernatant liquid was measured by a photoelectric colorimeter which was determined to be 23. The cloudiness of the kaolin clay containing water was 700. The resulting precipitate had hydrophobic properties and was easily filtered.

TEST 2

To 200 ml of river drainage containing 1,100 ppm of solid components (cloudiness 600), 10 ml of the diluted composition of Example 7 was added. The mixture was stirred and then allowed to remain quiescent for 10 minutes. The cloudiness of the resulting supernatant liquid was 10.

TEST 3

To 200 ml of each of three dye bath drainage solutions, the diluted composition of Example 7 was added and stirred. The mixtures were filtered through filter paper. The absorbance of each filtrate was measured with a photoelectric colorimeter. The results are shown in the following Table.

| Dye bath drainage Content | absorbance | Amount of diluted composition (ml) | Coagulant | Absorbance of filtrate |
|---|---|---|---|---|
| Diacotton Brilliant blue RW 200 ppm sodium sulfate 20,000 ppm | 3.88 | 10 | — | 0.018 |

| Dye bath drainage Content | absorbance | Amount of diluted composition (ml) | Coagulant | Absorbance of filtrate |
|---|---|---|---|---|
| Dianics Blue FG-SE 500 ppm sodium sulfate 100 ppm | 3.66 | 20 | aluminum sulfate 200 ppm | 0.027 |
| Diamirror Brilliant blue - R 200 ppm sodium carbonate 800 ppm sodium hydroxide 100 ppm sodium sulfate 6,000 ppm | 2.52 | 40 | — | 0.068 |

TEST 4

To 200 ml of starch drainage containing 1,000 ppm of corn starch, 10 ml of a solution, which was prepared by diluting the composition of Example 3 with 50 times the volume of water, was added and stirred. The mixture was allowed to remain quiescent for 10 minutes. The contents were filtered through filter paper and the filtrate was tested by an iodine reaction. No violet color change was found.

TEST 5

To 1,000 ml of a drainage suspension of paper fibriles discharged from a paper factory, 0.05 g of the viscous composition of Example 2 was added and stirred. The suspension was flocculated to a fine fibrous form. The suspension was turned in order to clean the material.

TEST 6

In order to increase the viscosity of various aqueous solutions, an aqueous solution of polyvinylalcohol or sodium polyacrylate was used. The composition of this invention can be used as a viscosity increasing agent which imparts threadable viscous characteristics to solutions which heretofore have not been able to be treated by conventional viscosity increasing agents. A dye bath containing 2 percent malachite green had a viscosity of about 15 c.p.s. 0.5 Parts of the composition having the threadable characteristics of Example 1 was added to 100 parts of said dye bath. The mixture was slowly stirred. The resulting dye bath has threadable characteristics and had a viscosity of about 300 c.p.s.

Having now fully described the invention, it will be apparent to one of ordinary skill in the art thtat many changes and modifications can be made thereto without departing from the spirit and scope of the invention as set forth herein.

What is claimed as new and intended to be covered by Letters Patent is:

1. A method of treating fluid drainage, which comprises:
    flocculating said fluid drainage with a filamentous liquid composition consisting essentially of from 5 - 50 parts by weight of a condensation product of an aromatic aldehyde and a polyhydroxy alcohol containing at least four hydroxyl groups, 15 - 50 parts by weight of a surfactant and 15 - 50 parts by weight of a polar organic solvent, all of which are uniformly dispersed in water, such that contaminants are removed from said waste fluid.

2. The method of claim 1, wherein said fluid drainage is food industry drainage or dye bath drainage, or an emulsion drainage containing mineral oil or cutting oil.

3. A filamentous liquid composition, which comprises:
    a mixture consisting essentially of 5 - 50 parts by weight of a condensation product of an aromatic aldehyde and a polyhydroxy alcohol containing at least four hydroxyl groups, from 15 - 50 parts by weight of a surfactant and 15 - 50 parts by weight of a polar organic solvent, all of which are uniformly dispersed in water.

4. The filamentous liquid composition of claim 3, wherein said aromatic aldehyde is selected from the group consisting of benzaldehyde, substituted benzaldehydes, phenylalkanals and phenylalkenyl aldehydes.

5. The filamentous liquid composition of claim 4, wherein said aromatic aldehyde is benzaldehyde, alkylbenzaldehydes, alkoxybenzaldehydes, hydroxybenzaldehyde, halogenated benzaldehydes, phenylacetaldehyde or cinnamaldehyde.

6. The filamentous liquid composition of claim 3, wherein said aromatic aldehyde is selected from the group consisting of benzaldehyde, tolualdehyde, cuminealdehyde, methoxybenzaldehyde, piperonal, chlorobenzaldehyde, p-hydroxy-m-methoxybenzaldehyde and cinnamaldehyde.

7. The filamentous liquid composition of claim 3, wherein said polyhydroxy alcohol is at least one member selected from the group consisting of pentitol and hexitol.

8. The filamentous liquid composition of claim 7, wherein said pentitol is xylitol and said hexitol is sorbitol or mannitol.

9. The filamentous liquid composition of claim 3, wherein the molar ratio of said aromatic aldehyde to said polyhydroxy alcohol in said condensation product is in the range of 0.5 - 3.

10. The filamentous liquid composition of claim 9, wherein the molar ratio is in a range of 1 - 25.

11. The filamentous liquid composition of claim 3, wherein said surfactant is at least one member selected from the group consisting of sodium alkylsulfates, sodium amide sulfate, sodium glycolether sulfates, sodium alkylsulfonates, sodium alkylarylsulfonates, sodium amide sulfonate, sodium alkyl phosphates, sodium alkyl polyoxyethylene phosphates, sodium alkyl polyoxyethylene phosphates, sodium alkyl phosphonates, sodium alkyl polyoxyethylene phosphonates, sodium dialkyl sulfosuccinates, quaternary ammonium chlorides having at least one higher substituent which is selected from the group consisting of higher alkyl, higher alkenyl, aryl and polyoxyethylene, higher alkyl pyridinium halides, alkoxy methyl pyridinium halides, 1-oxyethyl-2-alkyl or alkenyl substituted imidazoline salts, polyoxyethylene alkyl ethers, polyoxyethylene alkylaryl ethers, polyethylene glycol fatty acid esters and an amphoteric surfactant containing amino or quaternary ammonium moieties as the cationically active group and a carboxylic acid, sulfonate or sulfate moiety as the anionically active group.

12. The filamentous liquid composition of claim 3, wherein said polar organic solvent is at least one member selected from the group consisting of N-alkylamides, alkyl sulfoxides, mono- and dialkyl ethers of ethyleneglycols and their derivatives, nitriles, alcohols and ketones.

13. The filamentous liquid composition of claim 3, wherein the total weight of said condensation product and said surfactant in the composition is in the range of 0.01 – 10 percent.

14. The filamentous liquid composition of claim 13, wherein said range is 1 – 5 percent.

15. The filamentous liquid composition of claim 3, wherein said mixture contains boric acid.

* * * * *